US010845962B2

(12) United States Patent
Farver et al.

(10) Patent No.: US 10,845,962 B2
(45) Date of Patent: Nov. 24, 2020

(54) SPECIFYING USER INTERFACE ELEMENTS

(75) Inventors: Jennifer M. Farver, Chicago, IL (US); Joshua Goldshlag, Arlington, MA (US); David Parmenter, Newton, MA (US); Tim Wakeling, Andover, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 12/959,985

(22) Filed: Dec. 3, 2010

(65) Prior Publication Data

US 2011/0145748 A1 Jun. 16, 2011

Related U.S. Application Data

(60) Provisional application No. 61/286,293, filed on Dec. 14, 2009.

(51) Int. Cl.
*G06F 3/0484* (2013.01)
*G06F 16/22* (2019.01)
(Continued)

(52) U.S. Cl.
CPC .......... *G06F 3/0484* (2013.01); *G06F 3/0481* (2013.01); *G06F 3/04847* (2013.01);
(Continued)

(58) Field of Classification Search
CPC .................................................. G06F 8/00–38
(Continued)

(56) References Cited

U.S. PATENT DOCUMENTS

| | | | | |
|---|---|---|---|---|
| 4,901,221 A * | 2/1990 | Kodosky et al. | ............. | 715/771 |
| 4,914,568 A * | 4/1990 | Kodosky et al. | ............. | 715/763 |

(Continued)

FOREIGN PATENT DOCUMENTS

| | | |
|---|---|---|
| CN | 1961313 | 5/2007 |
| CN | 101000621 | 7/2007 |

(Continued)

OTHER PUBLICATIONS

Danikauskas, Tomas, et al., "Graphical User Interface Development on the Basis of Data Flows Specification." Computer and Information Sciences—ISCIS 2005 Lecture Notes in Computer Science, Jan. 1, 2005, pp. 904-914.

(Continued)

*Primary Examiner* — Matthew Ell
*Assistant Examiner* — Linda Huynh
(74) *Attorney, Agent, or Firm* — Fish & Richardson P.C.; Frank L. Gerratana

(57) ABSTRACT

Providing a user interface for configuring a computer-executable application includes receiving a specification defining: relationships among user interface elements, the relationships based on dependencies between components of a dataflow graph that includes multiple nodes representing components of the dataflow graph and links between the nodes representing flows of data between the components, parameters defining respective characteristics of the components of the dataflow graph, and variables defining respective characteristics of the user interface elements. During operation of a user interface, user interface elements are displayed based on the relationships defined in the specification.

52 Claims, 10 Drawing Sheets

(51) Int. Cl.
*G06F 3/0481* (2013.01)
*G06F 16/901* (2019.01)
*G06F 9/54* (2006.01)

(52) U.S. Cl.
CPC ................ *G06F 9/54* (2013.01); *G06F 16/22* (2019.01); *G06F 16/9024* (2019.01)

(58) Field of Classification Search
USPC ........................... 715/200–861; 717/100–178
See application file for complete search history.

(56) References Cited

U.S. PATENT DOCUMENTS 5,291,587 A * 3/1994 Kodosky et al. ................. 703/2
5,301,301 A * 4/1994 Kodosky et al. ............. 716/119
5,301,336 A * 4/1994 Kodosky et al. ............. 715/846
5,438,659 A * 8/1995 Notess ...................... G06F 8/38 715/202
5,481,741 A * 1/1996 McKaskle et al. ........... 345/522
5,844,554 A * 12/1998 Geller ....................... G06F 8/34 715/744
5,966,072 A 10/1999 Stanfill et al.
6,064,812 A * 5/2000 Parthasarathy et al. ...... 717/105
6,102,965 A * 8/2000 Dye et al. ..................... 717/109
6,173,438 B1 * 1/2001 Kodosky et al. ............. 717/109
6,219,628 B1 * 4/2001 Kodosky et al. ................. 703/2
6,300,948 B1 10/2001 Geller
6,437,805 B1 * 8/2002 Sojoodi et al. ............... 715/763
6,694,321 B1 2/2004 Berno
6,763,515 B1 * 7/2004 Vazquez et al. .............. 717/109
6,801,229 B1 10/2004 Tinkler
7,120,876 B2 * 10/2006 Washington et al. ......... 715/763
7,164,422 B1 * 1/2007 Wholey, III .......... G06F 9/4494 345/440.1
7,167,850 B2 1/2007 Stanfill
7,281,018 B1 * 10/2007 Begun ................... G06F 40/117
7,353,464 B1 4/2008 Kundu
7,533,347 B2 5/2009 Santori et al.
7,624,375 B2 11/2009 Santori et al.
7,701,869 B2 4/2010 Hogan
7,716,630 B2 5/2010 Wholey et al.
7,756,907 B2 7/2010 Stolte et al.
7,895,586 B2 2/2011 Ozone
7,937,665 B1 * 5/2011 Vazquez et al. .............. 715/763
8,146,007 B2 3/2012 Ramamoorthy et al.
8,156,481 B1 4/2012 Koh et al.
9,323,824 B2 4/2016 Vigneau
2001/0020291 A1 * 9/2001 Kudukoli et al. ................ 717/1
2001/0024211 A1 * 9/2001 Kudukoli et al. ............ 345/763
2001/0034733 A1 10/2001 Prompt et al.
2001/0047402 A1 * 11/2001 Saimi et al. .................. 709/219
2002/0170042 A1 11/2002 Do et al.
2003/0172193 A1 * 9/2003 Olsen ........................ G06F 8/38 719/315
2003/0174165 A1 9/2003 Barney
2003/0195867 A1 10/2003 Nye
2004/0015783 A1 1/2004 Lennon et al.
2004/0030993 A1 * 2/2004 Hong Huey .............. G06F 8/38 715/229
2004/0034848 A1 2/2004 Moore et al.
2004/0044912 A1 3/2004 Connary et al.
2004/0093342 A1 5/2004 Arbo
2004/0181543 A1 9/2004 Wu et al.
2004/0187079 A1 * 9/2004 Yamada ................ G06F 17/211 715/246
2004/0210445 A1 * 10/2004 Veronese et al. ................. 705/1
2004/0239674 A1 12/2004 Ewald et al.
2005/0060647 A1 3/2005 Doan et al.
2005/0066285 A1 3/2005 Santori et al.
2005/0114369 A1 5/2005 Gould et al.
2005/0193097 A1 9/2005 Guthrie
2005/0246717 A1 11/2005 Poole et al.
2005/0257195 A1 * 11/2005 Morrow et al. .............. 717/109
2005/0257198 A1 * 11/2005 Stienhans ........... G06F 11/3672 717/124
2005/0283478 A1 * 12/2005 Choi et al. ........................ 707/9
2005/0289356 A1 12/2005 Shoham
2006/0036745 A1 * 2/2006 Stienhans ................. G06F 8/38 709/228
2006/0095466 A1 * 5/2006 Stevens et al. ........... 707/103 R
2006/0129690 A1 6/2006 Hill et al.
2006/0179150 A1 8/2006 Farley
2006/0294150 A1 * 12/2006 Stanfill ..................... G06F 8/51
2007/0011668 A1 * 1/2007 Wholey .................... G06F 8/34 717/151
2007/0073712 A1 3/2007 Falk et al.
2007/0079286 A1 4/2007 Cook
2007/0150429 A1 6/2007 Huelsman et al.
2007/0192863 A1 8/2007 Kapoor et al.
2007/0233655 A1 * 10/2007 Engels .............................. 707/3
2007/0239628 A1 10/2007 Peck et al.
2007/0256053 A1 * 11/2007 Torgerson ................. G06F 8/33 717/110
2007/0271381 A1 * 11/2007 Wholey ................ G06F 9/5066 709/226
2007/0276689 A1 * 11/2007 Slone ........................ G06F 8/38 717/109
2007/0294213 A1 12/2007 Hacigumus et al.
2008/0049022 A1 2/2008 Sherb et al.
2008/0082959 A1 * 4/2008 Fowler ................ G06F 9/44505 717/104
2008/0091491 A1 * 4/2008 Thorpe .................. G06Q 10/06 707/805
2008/0256014 A1 10/2008 Gould et al.
2008/0263386 A1 10/2008 Darrington et al.
2008/0270920 A1 * 10/2008 Hudson ......................... 715/763
2009/0006454 A1 * 1/2009 Zarzar et al. ................. 707/102
2009/0083313 A1 * 3/2009 Stanfill et al. ................ 707/102
2009/0183094 A1 * 7/2009 Ramamoorthy ... G05B 19/0426 715/763
2009/0319494 A1 12/2009 Gooder
2009/0327196 A1 12/2009 Studer et al.
2010/0217783 A1 8/2010 Farver et al.
2010/0235495 A1 9/2010 Petersen et al.
2010/0262902 A1 * 10/2010 Burns ................... G06F 16/838 715/234
2011/0145748 A1 6/2011 Farver et al.
2011/0153667 A1 6/2011 Parmenter et al.
2014/0229846 A1 8/2014 Abaya et al.
2015/0301861 A1 10/2015 LaChiusa et al.

FOREIGN PATENT DOCUMENTS

EP 2287808 A2 * 2/2011 ............... G06F 8/34
JP 2004/516529 6/2004
WO WO 2001/95089 12/2001
WO 2002/11344 2/2002
WO 2006/091624 8/2006
WO WO 2007/076509 7/2007
WO WO 2007076509 A2 * 7/2007

OTHER PUBLICATIONS

International Search Report & Written Option issued in PCT application PCT/US2010/058875, dated Apr. 13, 2011, 13 pages.
International Search Report & Writing Opinion issued in PCT application No. PCT/US2010/024115, dated Apr. 16, 2010, 14 pages.
Notification Concerning Transmittal of International Preliminary Report on Patentability (Chapter I of the Patent Cooperation Treaty), PCT, dated Jun. 28, 2012.
Transaction History, U.S. Appl. No. 12/705,129, filed Jul. 11, 2013, 2 pages.
Transaction History, U.S. Appl. No. 13/764,998, filed Jul. 11, 2013, 1 page.
International Search Report and Written Opinion issued in PCT/US2014/15580, dated Jul. 8, 2014 (9 pages).
Chinese Office Action, English Translation, application No. 201080016467.5, dated Jul. 17, 2014, 37 pages.

(56) References Cited

OTHER PUBLICATIONS

Japanese Office Action, with English Translation, application No. 2012-543166, dated Oct. 30, 2014.
European Office Action for Application No. 14751109.1 dated Aug. 23, 2016.
Supplemental European Search Report, European Application No. 10741811.3, dated Aug. 9, 2016 (4 pages).
Supplementary European Search Report for Application No. 14751109.1 dated Aug. 8, 2016. 4 pages.
Chinese Office Action, with English Translation, application No. 2010800638065, dated Sep. 29, 2015.
Japanese Office Action , with English translation, application No. 2012-543166, dated Oct. 30, 2015 (12 pages).
Transaction History, U.S. Appl. No. 12/705,129, filed Mar. 14, 2016, 3 pages.
Transaction History, U.S. Appl. No. 13/764,998, filed Mar. 14, 2016, 2 pages.

* cited by examiner

720

| | | | | | |
|---|---|---|---|---|---|
| 1 | a | red | 6.2 | x | m |
| 2 | b | blue | 1.5 | x | f |
| 3 | c | red | 6.7 | x | m |
| 4 | d | green | 5.2 | x | m |
| 5 | e | green | 7.3 | x | f |
| 6 | d | blue | 1.8 | x | m |
| 7 | t | red | 9.0 | x | f |

FIG. 7

SPECIFYING USER INTERFACE ELEMENTS

CROSS-REFERENCE TO RELATED APPLICATIONS

This application claims priority to U.S. Application Ser. No. 61/286,293, filed on Dec. 14, 2009, incorporated herein by reference.

BACKGROUND

This description relates to specifying user interface elements.

A user interface can be generated and displayed to a user to allow the user to interact with data that is processed by a computational system. Some user interfaces are static components of an application program and the user interfaces operate in the same way for multiple users of the problem. Some user interfaces can be defined by a user of the application program so that the user interface is custom-tailored for a particular purpose. For example, an application program may allow the specification of multiple user interfaces and a user can choose from among the multiple user interfaces.

SUMMARY

In one aspect, in general, a method for providing a user interface for configuring a computer-executable application includes receiving a specification defining relationships among user interface elements, the relationships based on dependencies between components of a dataflow graph that includes multiple nodes representing components of the dataflow graph and links between the nodes representing flows of data between the components, parameters defining respective characteristics of the components of the dataflow graph, and variables defining respective characteristics of the user interface elements; and during operation of a user interface, displaying user interface elements based on the relationships defined in the specification.

In one aspect, in general, a computer-readable medium storing a computer program for providing a user interface for configuring a computer-executable application, the computer program including instructions for causing a computer to receive a specification defining relationships among user interface elements, the relationships based on dependencies between components of a dataflow graph that includes multiple nodes representing components of the dataflow graph and links between the nodes representing flows of data between the components, parameters defining respective characteristics of the components of the dataflow graph, and variables defining respective characteristics of the user interface elements, and during operation of a user interface, display user interface elements based on the relationships defined in the specification.

In one aspect, in general, a system for configuring a computer-executable application includes means for receiving a specification defining relationships among user interface elements, the relationships based on dependencies between components of a dataflow graph that includes multiple nodes representing components of the dataflow graph and links between the nodes representing flows of data between the components, parameters defining respective characteristics of the components of the dataflow graph, and variables defining respective characteristics of the user interface elements, and means for displaying user interface elements based on the relationships defined in the specification, during operation of a user interface.

Aspects can include one or more of the following features. At least some of the relationships among the user interface elements are based on dependencies between data elements received from at least one of a database, a data file, a metadata repository, and a web service. The specification defines source values indicating data received during the operation of the user interface and defines target values indicating data updated during the operation of the user interface. The aspect includes, during operation of the user interface, updating data based on a user's interaction with the user interface elements. At least some of the parameters include the updated data. At least some of the updated data is included in at least one of a data file, a database, and a metadata engine, and a data source associated with a web service. The aspect includes receiving data associated with the parameters from an external source. The external source is at least one of a data file, a database, a metadata engine, and a web service. The aspect includes displaying component output data associated with at least one flow of data represented by a link of the dataflow graph. At least one parameter defines a property of at least one of the components of the dataflow graph, the property associated with one of the user interface elements. The user interface element is defined to provide data to the property. The user interface element is defined to receive data from the property. During the operation of a user interface, at least one user interface element is displayed based on at least one of the variables. The user interface element is displayed in response to a change in one of the variables. The specification is defined in an extensible markup language. The specification includes an expression defined in a language native to a database management system. The aspect includes automatically acquiring at least one parameter from the dataflow graph. At least one variable defines a reference to an object stored in a database system. The specification defines a reference to a data file external to the specification. The reference includes a pointer to a value stored in the data file. At least one variable defines the reference. At least one parameter defines the reference. The specification includes a query string for accessing data stored in a database system. The query string includes an argument specified by a user during the operation of the user interface. The query string is executable during the operation of the user interface. At least one parameter includes the query string. At least one variable includes the query string.

Aspects can include one or more of the following advantages. A specification can be defined that allows a dataflow graph to be configured in a visual manner. Multiple specifications can be used with one dataflow graph.

Other features and advantages of the invention will become apparent from the following description, and from the claims.

DESCRIPTION OF DRAWINGS

FIG. 7 represents an exemplary display of results in the interface.

DESCRIPTION

Figure 1:
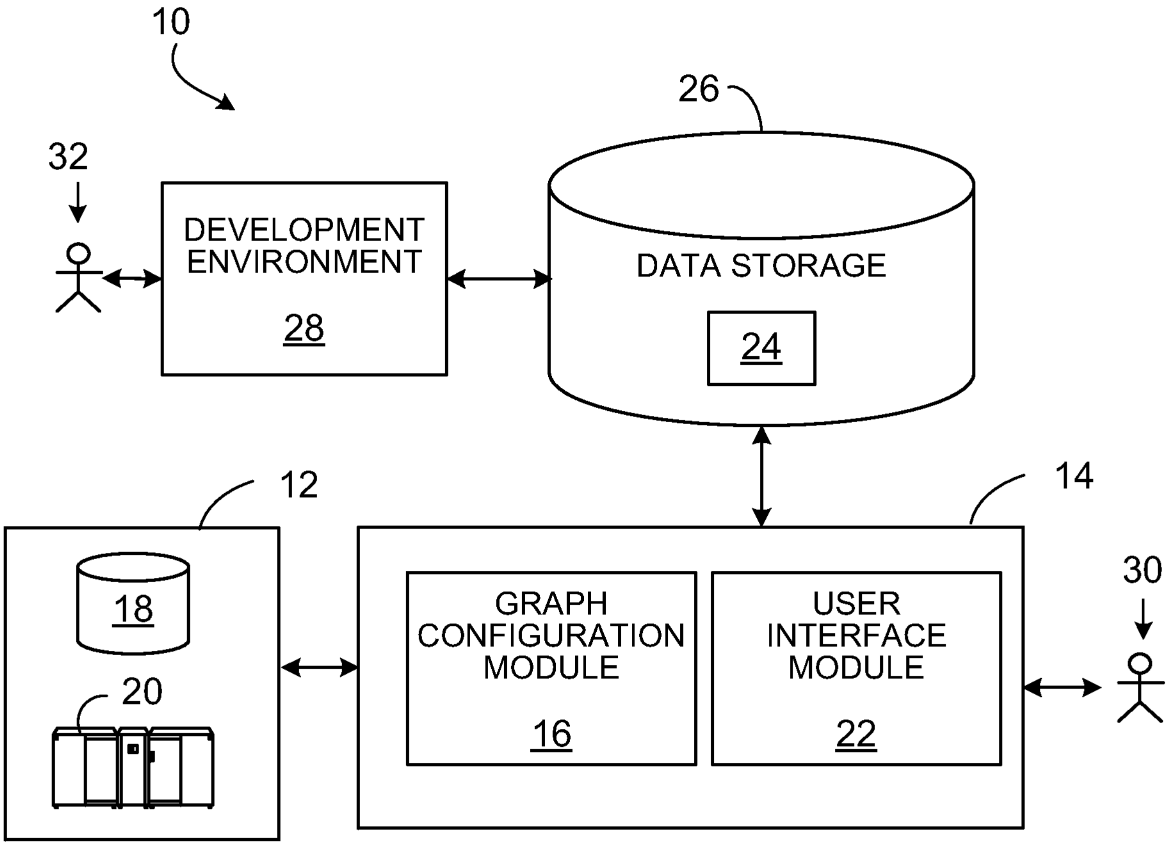
FIG. 1 is a schematic diagram of a database management system.

Referring to FIG. 1, a system 10 for configuring dataflow graphs includes a data source 12 that may include one or more sources of data such as storage devices or connections to online data streams, each of which may store data in any of a variety of storage formats (e.g., database tables, spreadsheet files, flat text files, or a native format used by a mainframe). An execution environment 14 includes a graph configuration module 16 and a user interface module 22. The execution environment 14 may be hosted on one or more general-purpose computers under the control of a suitable operating system, such as the UNIX operating system. For example, the execution environment 14 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof.

The graph configuration module 16 changes the configuration of dataflow graphs, as described in more detail below. The user interface module 22 displays configuration information to a user 30 and receives configuration actions from the user 30. The user interface module 22 also communicates with the graph configuration module 16, which configures dataflow graphs based on the actions of the user. For example, the dataflow graphs can be stored in the data source 12. Storage devices providing the data source 12 may be local to the execution environment 14, for example, being stored on a storage medium connected to a computer running the execution environment 14 (e.g., hard drive 18), or may be remote to the execution environment 14, for example, being hosted on a remote system (e.g., mainframe 20) in communication with a computer running the execution environment 14 over a local or wide area data network.

The execution environment is in communication with a data storage system 26 which contains information used by the user interface module 22 to display a user interface. The data storage system 26 is also accessible to a development environment 28 in which a developer 32 is able to develop user interfaces, stored in the data storage system 26, that are used by the user interface module 22 to display a user interface.

The data source 12 is, in some implementations, a system for developing applications as dataflow graphs that include vertices (components or datasets) connected by directed links (representing flows of work elements) between the vertices. For example, such an environment is described in more detail in U.S. Publication No. 2007/0011668, entitled "Managing Parameters for Graph-Based Applications," incorporated herein by reference.

A dataflow graph is a computer program executed within a dataflow graph execution environment that processes data from one or more data sources. The data from the data sources are manipulated and processed according to the dataflow graph and exported to one or more data sinks Data sources and sinks can include files, databases, data streams, or queues, for example. Dataflow graphs are represented as directed graphs including nodes representing data processing components each including code for processing data from at least one data input and providing data to at least one data output, and nodes representing dataset objects for accessing the data sources and/or sinks. The nodes are connected by directed links representing flows of data between the components, originating at the data sources and terminating at the data sinks. The data output ports of upstream components are connected to the data input ports of downstream components. The dataflow graphs may be reused for different data sources and different data sinks represented by the dataset objects. The data structures and program code used to implement dataflow graphs can support multiple different configurations by being parameterized to enable different sources and sinks to be substituted readily, for example. Furthermore, in some arrangements, the flow of the dataflow graph may be altered by the use of parameters, such that a component or a series of components may be bypassed. In general, a parameter represents a property of a dataflow graph that can be configured or changed. For example, a property can be changed between uses of the dataflow graph, and the dataflow graph may perform operations differently as a result of the change.

The construction of a dataflow graph can be highly technical in nature in some cases. While written to achieve specific business ends, the underlying structure and construction of the graph is determined based upon technical considerations. For example, graph components may be selected to maximize reusability, or to support parallel processing. On the other hand, how and where a graph is used may be largely a business decision. Some of the parameters associated with a parameterized dataflow graph can be used to enable business users to customize dataflow graphs without requiring the user to understand the technical complexities behind its implementation. The parameterized dataflow graphs simplify customization and facilitate reuse.

An interface for identification of parameter values for constructing a dataflow graph can be presented on a client machine. In some implementations, the client may be accessing a development environment running on a server using a web browser on the client that provides the parameter interface, and using a scripting language which provides some capability for client side processing. The scripting language may communicate with the server to update parameters and perform other necessary operations. This communication may occur via a bridge machine which translates the communications between the client and the server running a development environment storing objects and associated parameter values for the graphs being constructed.

Figure 2A:
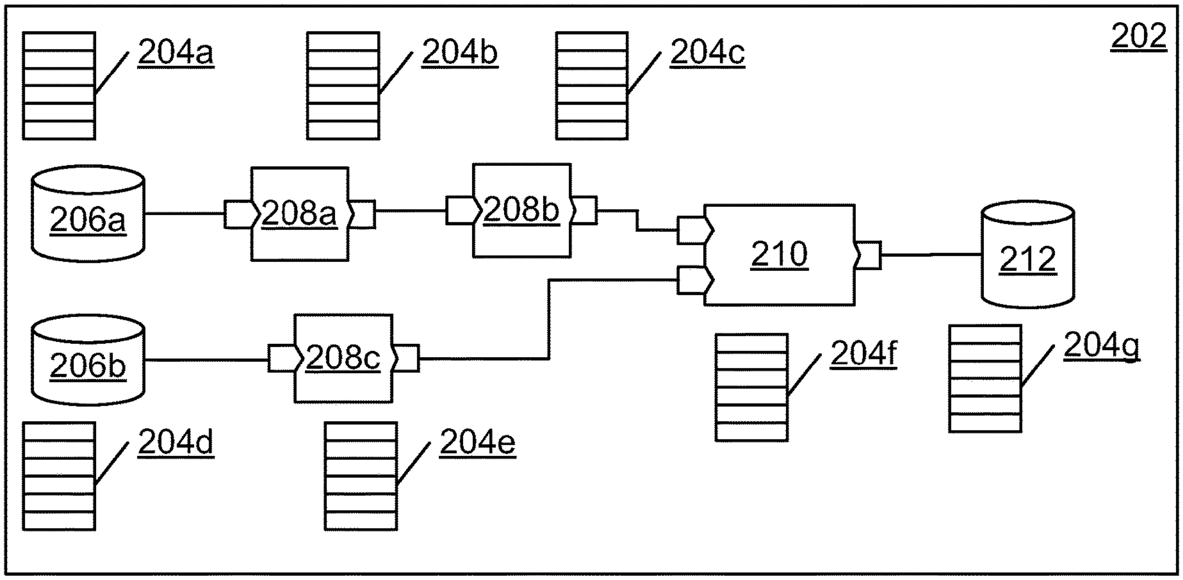
FIG. 2A is a diagram of an exemplary dataflow graph.

The interface allows a user to configure the parameters of a parameterized dataflow graph even if the user lacks technical knowledge relating to dataflow graphs and dataflow graph configuration. For example, referring to FIG. 2A a dataflow graph 202 may include data sources 206*a*, 206*b*, components 208*a-c*, 210 and data sinks 212. Each of the sources, components, and sinks may be associated with a set of parameters 204*a-g*. A parameter for one source, component, or sink may be used to evaluate a parameter for a different source, component, or sink. The sources 206*a*, 206*b* are connected to the input ports of components 208*a*, 208*c*. The output port of component 208*a* is connected to the input port of component 208*b*. The output port of component 210 is connected to data sink 212. The connections between the sources, components, and sinks define the data flow.

Some of the data sources, components, or sinks may have input parameters 204*a-g* which may define some of the behavior of the graph. For example, a parameter may define the location of the data source or sink on a physical disk. A parameter may also define the behavior of a component, for example, a parameter may define how a sorting component sorts the input. In some arrangements, the value of one parameter may depend upon the value of another parameter. For example, a source 206*a* may be stored in a file in a particular directory. The parameter set 204*a* may include a parameter called "DIRECTORY" and another called "FILENAME". In this case the FILENAME parameter would depend upon the DIRECTORY parameter. (e.g., DIRECTORY may be "/usr/local/" and FILENAME may be "/usr/local/input.dat"). Parameters may also depend upon the parameters for other components. For example, the physical location of a sink 212 may depend upon the physical location of the source 206*a*. In this example, the sink 212 includes a set of parameters 204*g* which includes a FILENAME parameter which depends upon the DIRECTORY parameter of the source 206*a*. (e.g., the FILENAME parameter in the set 204*g* may be "/usr/local/output.dat" where the value "/usr/local/" is obtained from the DIRECTORY parameter in the set 204*a*.)

Figure 2B:
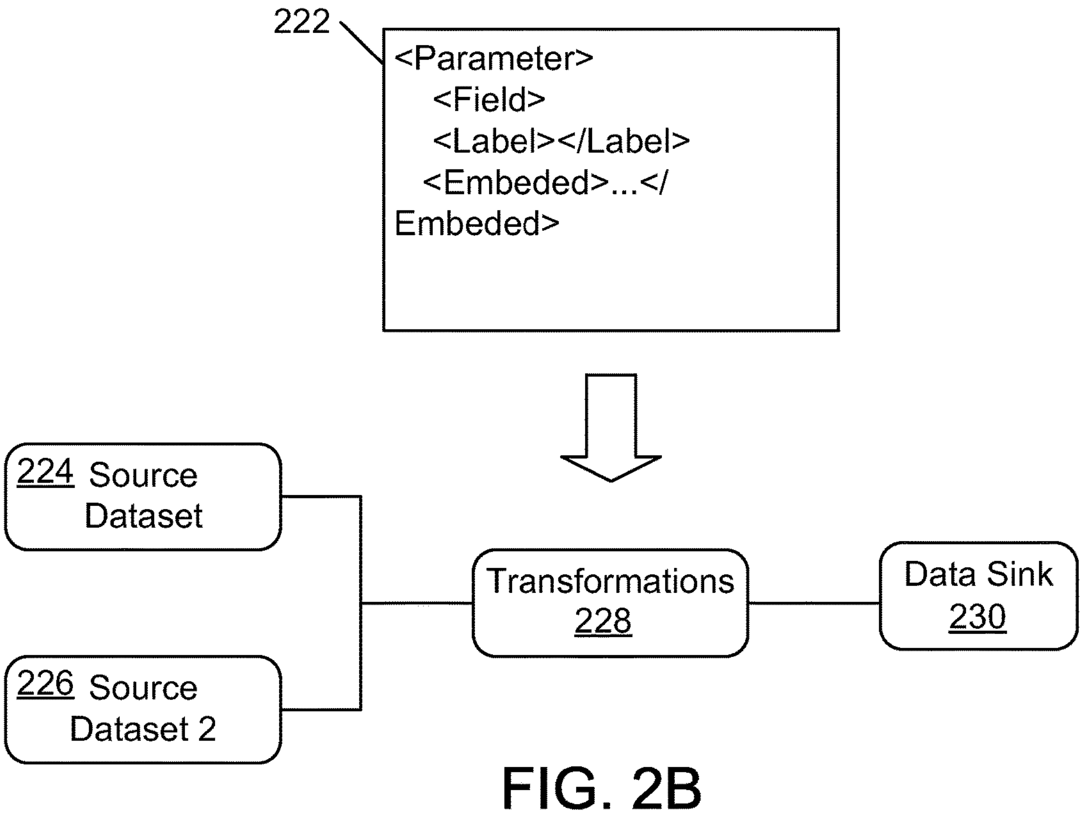
FIGS. 2B and 2C are diagrams of portions of an interface for customizing the dataflow graph.

Within the user interface on the client, the parameters of the parameter sets 204*a*-204*g* may be combined and reorganized into different groups for interacting with a user, which reflect business considerations rather than technical ones. The user interface for receiving values for the parameters based on user input can display different parameters according to relationships among the parameters in a flexible way that is not necessarily restricted by aspects of the development environment on the server. For example, referring to FIG. 2B, a user interface can be presented in which icons are displayed with relationships that represent dependencies among the parameters. In this example, the parameters are divided into a first group of parameters, represented by a first source icon 224 representing parameters for a first source dataset, a second source icon 226 representing parameters for a second source dataset, a sink icon 230 representing parameters for a sink dataset, and a transformation icon 228 that representing parameters for one or more components of the dataflow graph being configured, showing their relationship to the source datasets and the sink dataset. This grouping of parameters may be made based on a stored specification 222 which defines how a user will interact with the parameters from the dataflow graph within the user interface on the client and how the user interface elements, such as the icons 224, 226, 228, 230, will be related to each other and arranged for presentation in the user interface. In some implementations, the specification is an XML document. The specification may also identify the dataflow graph components and may identify particular components for which certain functions can be performed while the user is configuring the graph, such as viewing sample data, as described in more detail below.

Figure 2C:
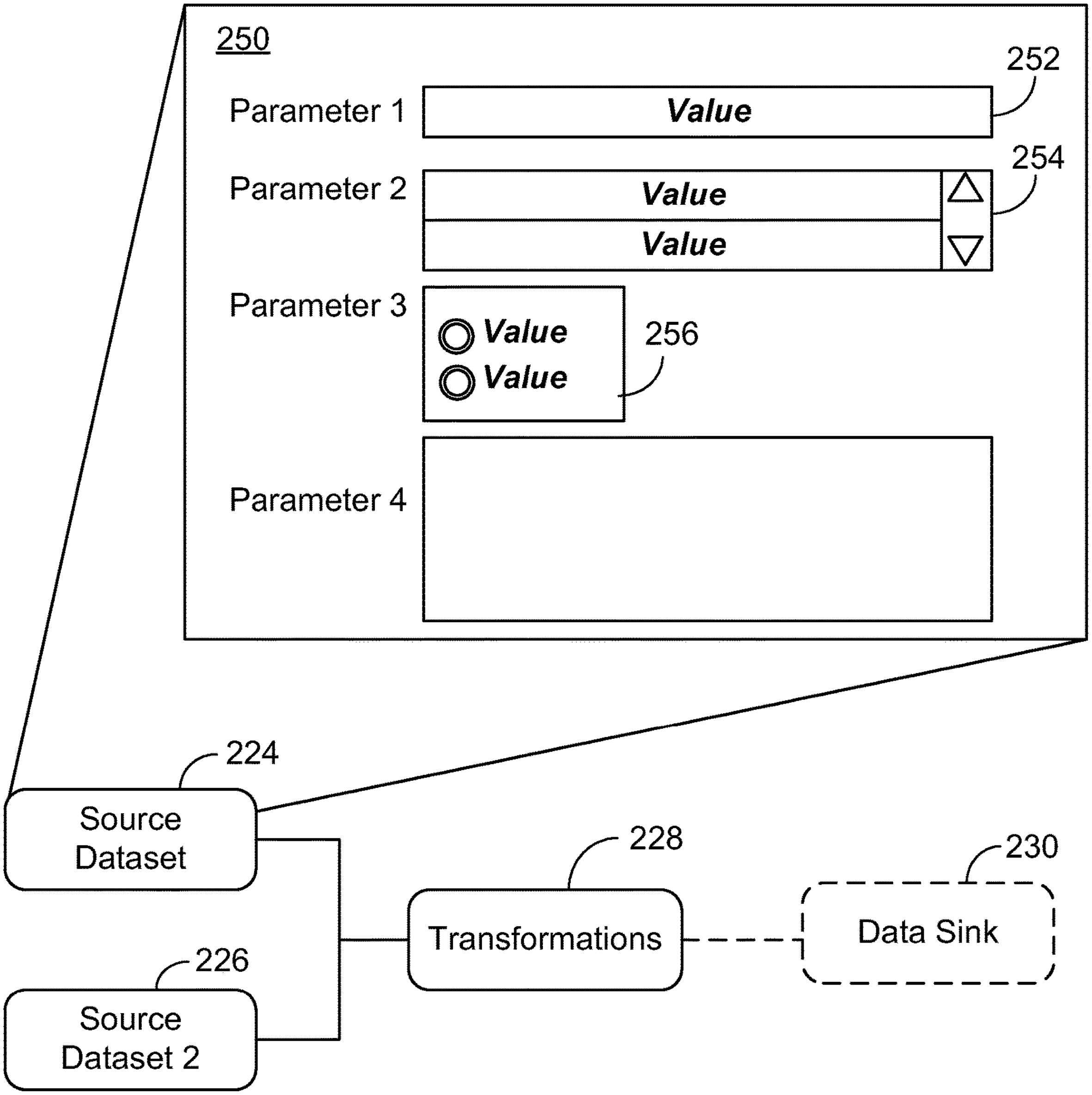

In some cases, the specification may include instructions for how parameters are to be displayed. For example, referring to FIGS. 2B and 2C, the specification 222 may define a user interface 250 displayed to a user. Further, the specification 222 may indicate that, in response to interacting with the source dataset icon 224, one parameter should be displayed in the user interface 250 as a text box 252 that the user may fill in, while another parameter should be displayed in the user interface 250 as a drop down list 254 with prepopulated values, still another parameter may be displayed in the user interface 250 as a radio button 256, etc. Thus, the specification provides flexibility in how the parameters are to be presented to the user for customizing a dataflow graph in a way that can be tailored to a business and/or non-technical user.

In some cases, the specification may constrain the order in which a business user populates the parameter values. Represented by the dotted lines, parameters associated with the sink 230 may not be visible to the user until the user meets some predefined condition. For example, the user may have to provide a particular parameter value or fill out a set of parameters before the data sink parameter set appears.

In some implementations, the specification can also include variables which define characteristics of user interface elements (in contrast to parameters which define characteristics of the components of the dataflow graph). The variables can be used to control the order in which user interface elements are used by the business user, for example. A variable references at least one data value. In some examples, a variable references multiple data values, and each data value is defined as a property of the variable. Thus, a single variable can have multiple properties, each associated with data values.

The user interface 250 defined by the specification can be presented in a way that the user interface elements (e.g. text box 252, drop down list 254, radio button 256) do not correspond directly to parameters used to customize a dataflow graph. Instead, some of the user interface elements can correspond to configuration options relevant to a user, for example, a business user and/or non-technical user who may not have knowledge of the parameters.

In these examples, the user interface 250 need not be associated with a particular component 224 of a dataflow graph. Further, the user interface 250 can be associated with multiple dataflow graphs and other data processing and data storage constructs.

For example, a user interface element can allow the user to change a configuration option having a business meaning, rather than a technical meaning. The configuration option could be an option for converting between types of currency used in a commercial transaction, or an option to update information associated with a particular category of product inventory, or another kind of option that does not correlate to the configuration of a single parameter. The specification 222 can be defined in such a way that the business user/non-technical user can make changes to configuration options in terms that he/she understands, and changes to parameters are made through associations and dependencies defined in the specification 222.

The specification 222 can define how the configuration option corresponds to the configuration of the parameters of a dataflow graph as well as other data elements that can be configured through the user interface 250. For example, an interaction between a user and a user interface element may trigger a change to parameters in multiple dataflow graph components as well as changes to data stored in a database, a data file, a metadata repository, or another kind of data storage. The specification 222 can define the relationship between the user interface element and data that changes in association with a change to the user interface element during the operation of the user interface 250.

The specification 222 can also define the user interface elements based on data received from a database, a data file, a metadata repository, or another kind of data storage, or another kind of data source such as a web service. When the user interface 250 is displayed, the received data is used to determine the manner in which to display the user interface elements. In some implementations, during the operation of the user interface 250, data is received from an external source such as a database, a data file, a metadata repository, or another kind of data storage, or another kind of data source such as a web service, and the data received from an external source is defined in the specification 222 to be associated with a parameter (e.g., the parameter is updated to include the data received from the external source).

The user interface could also display component output data associated with at least one flow of data represented by a link of the dataflow graph. For example, referring to FIG. 2C, data flows from one component 224 to another component 228. The flow of data between the components can be viewed in the user interface 250. In some examples, sample data (e.g., data retrieved for the purpose of testing, rather than for the purpose of processing or transformation) is provided to one component 224 to determine how the data is handled by the component 224.

Figure 3:
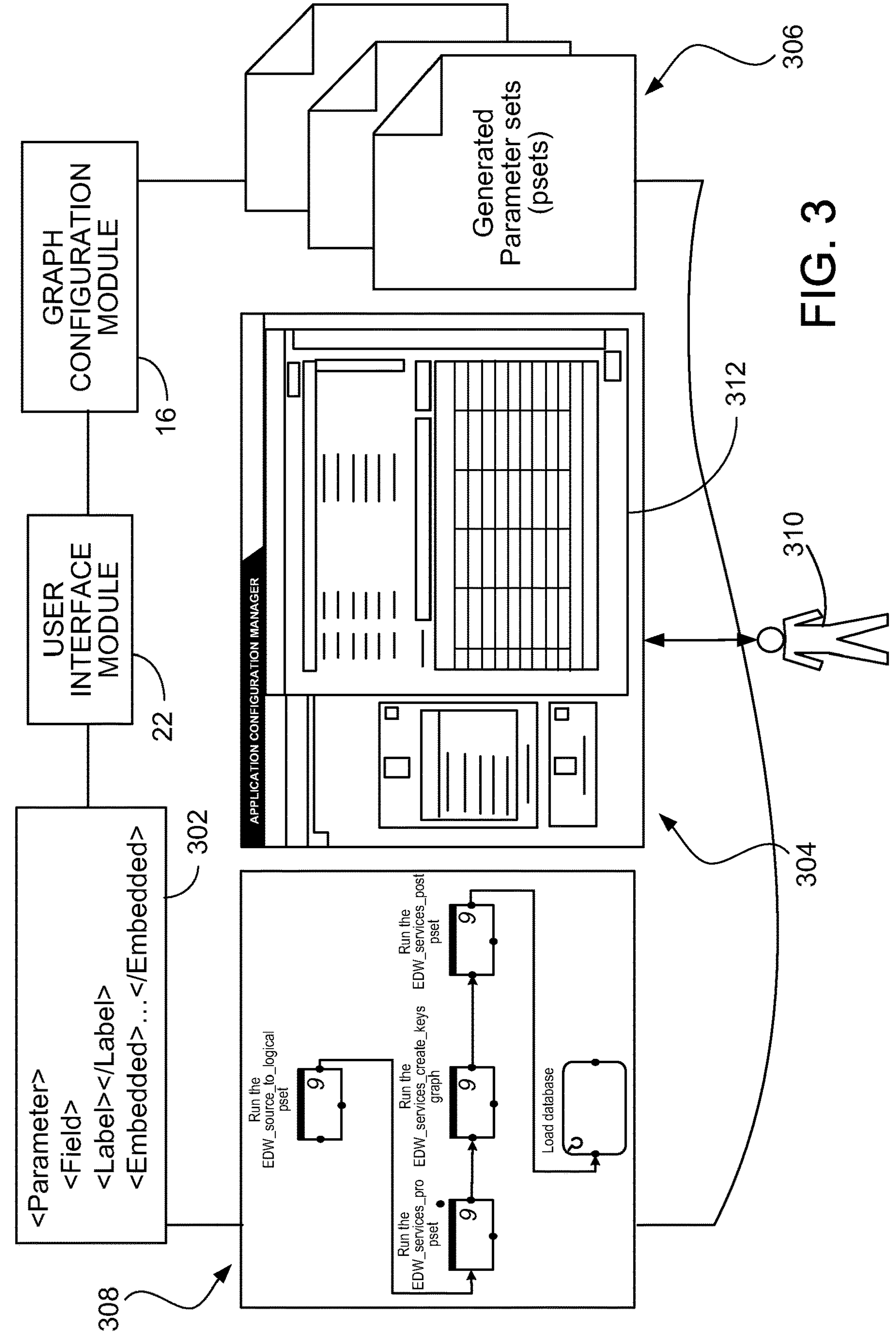
FIG. 3 is a process diagram showing receiving a user interface specification and displaying a user interface.

As shown in FIG. 3, the specification 302 defines relationships between parameters, variables, and user interface elements. The specification 302 can be written to include definitions of parameters in dataflow graphs, and the user interface elements can be used to read parameters from a dataflow graph 308 or write parameters to the dataflow graph 308. When the user interface module 22 generates a user interface 304 based on the specification 302, the user interface 304 displays user interface elements 312 including the parameters. For example, the user interface 304 may display a value associated with a parameter that can be edited by a user, or otherwise allow a user 310 to configure the dataflow graph 308 associated with the parameter. During the operation of the user interface, a user's change to a parameter can be written to the parameter set 306 of the corresponding dataflow graph 308, for example, by the graph configuration module 22. Other types of data can be updated during the operation of the user interface 304. For example, the user interface 304 can provide updated data to a database, a data file, a metadata repository, another kind of data storage, or provide data to a remote data source accessible by a web service or other network service.

Figure 4A:
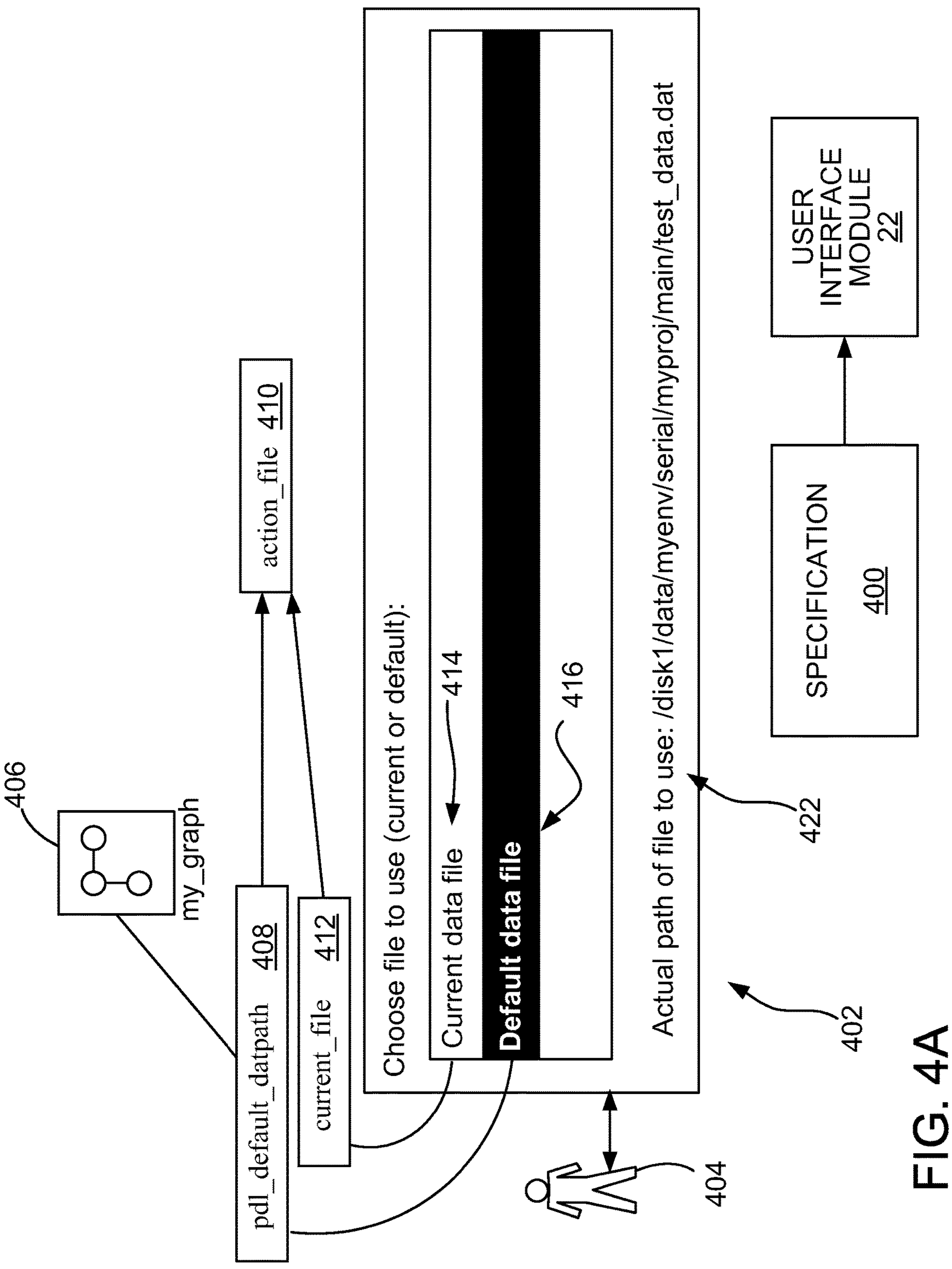
FIGS. 4A and 4B are diagrams of a user's interaction with a user interface.

In some implementations, the specification defines variables can be used to control user interface elements. The use of parameters and variables is demonstrated here by way of example. FIG. 4A shows user interface elements 402 defined by the specification 400 in which a user can choose among multiple files (e.g. files containing input data for a dataflow graph), such as a current data file option 414 and a default data file option 416. The specification 400 can define a variable indicating the path of a current file, which may change during the operation of the user interface. Further, the specification can define a parameter indicating the path of a default file, such that the parameter is accessible as data associated with the configuration of a dataflow graph.

The XML code below represents a portion of a specification 400 that can be used to display the user interface elements 402. For example, the user interface module 22 can receive the specification and display the user interface elements 402 to a user 404 A variable is defined called "current_file" 412 and represents a file path previously selected in the user interface by a user 404. Another variable is defined called "action_file" 410 and represents a file to use in upcoming dataflow graph operations, for example, reading and writing. The specification 400 also defines user interface elements 402 represented as a selection box. The selection box lists the text "Current data file" and this text is linked to the variable "current_file" 412. The selection box also lists the text "Default data file" and this text is linked to the parameter "pdl_default_adatpath" 408 which is accessible as configuration data associated with a dataflow graph called "my_graph" 406.

```
<Variables name="vars">
<Variable name="current_file" type="string"/>
<Variable name="action_file" type="string"/>
</Variables>
...
<List>
<Label>Choose file to use (current or default)</Label>
<ChoiceDisplayNames>
<Constant>Current data file</Constant>
<Constant>Default data file</Constant>
</ChoiceDisplayNames>
<Choices>
<SourceValue reference="vars.current_file"/>
<SourceValue reference="pset.my_graph.pdl_default_datpath"/>
</Choices>
<SourceValue reference="vars.current_file"/>
<TargetValue reference="vars.action_file"/>
</List>
<TextLabel>
<Label>
<Expression>"Actual path of file to use: " +
vars.action_file</Expression>
</Label>
</TextLabel>
```

When a user interface based on the specification is in operation, the user can select from the two options, "Current data file" and "Default data file." If the user chooses "Current data file," the user interface assigns the contents of the variable "current_file" 412 to the variable "action_file" 410. If the user chooses "Default data file," the user interface assigns the contents of the parameter "pdl_default_datpath" 408 to the variable "action_file" 410. Thus, the interface provides the user with the option of performing configuration actions based on either a parameter associated with a dataflow graph or a variable associated with the user interface elements.

A change made at one user interface element during the operation of the user interface can cause another change at another user interface element. In the example shown in FIG. 4A, the contents 422 of the vars.action_file variable are displayed in the user interface element 402. The vars.action_file variable may be changed by another user interface element different from the user interface element 402 shown, causing the display of the contents 422 of the variable to change in response.

Figure 4B:
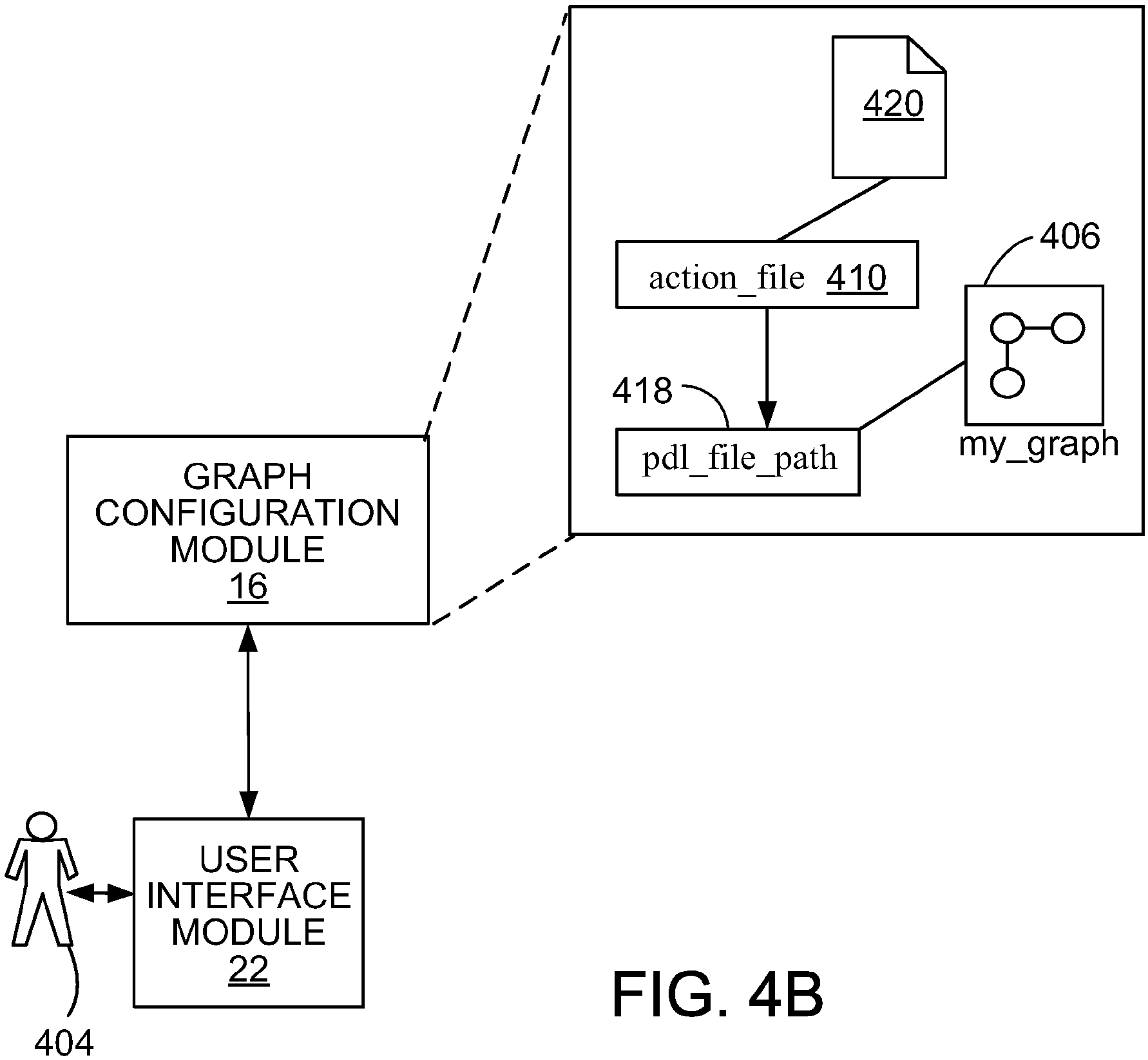

Further, the variable "action_file" 410 can be used to configure a dataflow graph. As shown in FIG. 4B, the user interface module 22 can receive an action from a user 404 to assign the contents of the variable "action_file" 410 to a parameter "pdl_file_path" 418 of a dataflow graph 406, allowing the dataflow graph 406 to read to or write from the file 420 represented by the "action_file" file path.

In the example shown here, the data elements identified by the SourceValue and TargetValue tags represent variables and parameters. Data elements identified by the SourceValue and TargetValue tags could also be data elements stored in a data file, data elements stored in a database (e.g., database records or portions of database records), data elements stored in a metadata repository, data elements stored in another type of data storage, or data elements accessible using a web service or other network service.

Figure 5:
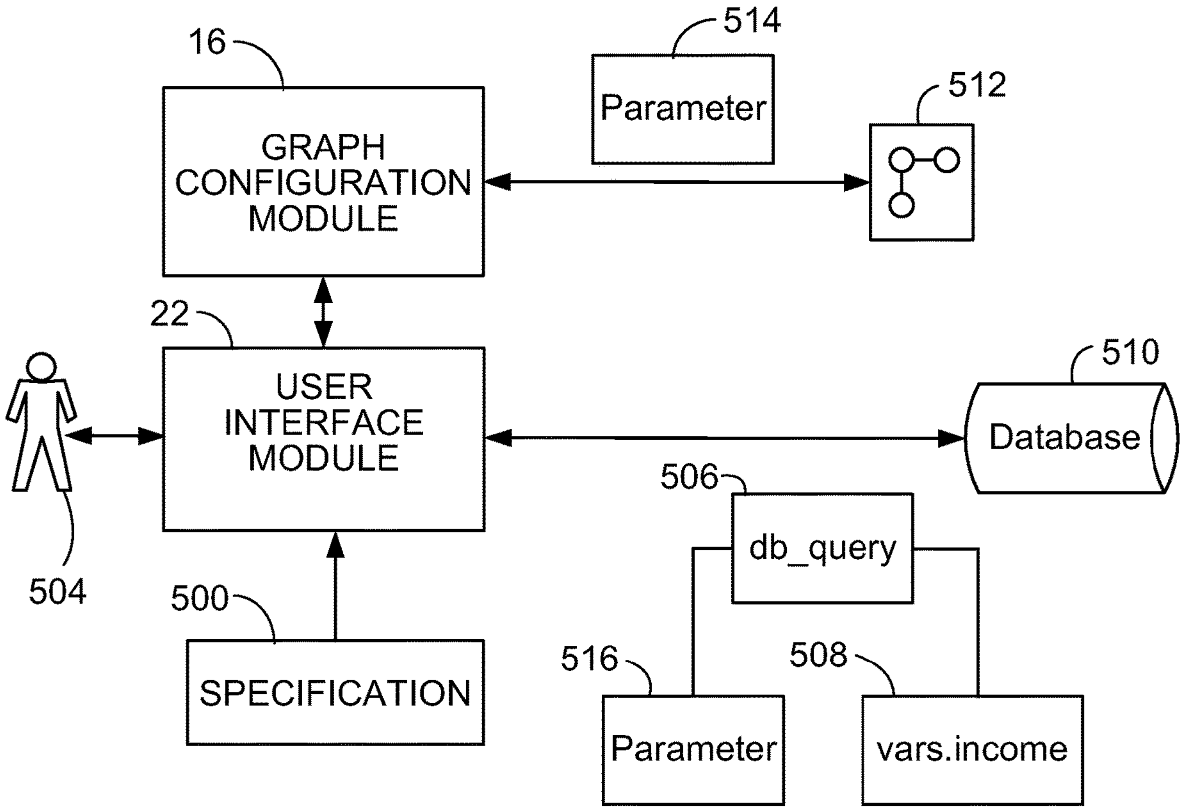
FIG. 5 is a diagram of a user's interaction with a user interface and a database.

As shown in FIG. 5, a specification 500 can also incorporate terms defined in a language other than a native language of the specification. For example, the specification can be defined in XML, and can also include a database query 506 written in structured query language (SQL). The example below is a portion of a specification 500 that defines an SQL database query 506. The specification 500 includes a "Query" tag that identifies the query. The query itself is associated with a variable defined in the specification, "db_query."

```
<Metadata>
<Variables name="vars">
<Variable name="source" type="databaseObject"/>
<Variable name="income" type="integer" value=10000/>
...
</Variables>
<Database name="mrkt_db" dbcPath="$AI_DB/mrkt.dbc">
<Query name="db_query">
select * from PROSPECT where income > vars.income
</Query>
</Database>...
</Metadata>
<UserInterface>
<TextInput>
<Label>Enter income</Label>
<TargetValue reference="vars.income"/>
</TextInput>
...
<DatabaseBrowser>
<Database reference="mrkt_db"/>
...
<SourceValue reference="mrkt_db.db_query"
property="lname_array"/>
<SourceTargetValue reference="vars.source"/>
</DatabaseBrowser>
```

The specification 500 also includes a "Database" tag that identifies a database 510 accessible from a user interface displayed by the user interface module 22 as defined by the specification 500. The specification 500 also includes a "DatabaseBrowser" tag that establishes a user interface element for accessing database information when the user interface is in operation.

In this example, the database query 506 includes a variable defined in the specification, "vars.income" 508. During operation of the user interface, the user can enter a value for "vars.income" 508. When the database 510 is accessed, the query 506 is sent to the database for execution and incorporates the value entered by the user represented by "vars.income" 508. In some examples, the query 506 could incorporate a parameter 516 associated with a dataflow graph. In some examples, the user interface can also be used with the graph configuration module 16 to change a parameter 516 of a dataflow graph 512 by changing the data value associated with the parameter 516 to an element of data acquired from the database 510 using the database query.

Other languages could also be incorporated into the specification. The example below shows the incorporation of a database management language expression in a portion of a specification. The expression is identified with an "Expression" tag in the specification. The database management language expression can be used to access and process parameters of a dataflow graph in a language native to the dataflow graph. In this example, the expression evaluates the contents of the parameter "TARGET_TABLE" to determine if the parameter is associated with any data. A database management language expression can also be used to assign data values to parameters.

```
<SourceValue>
<Expression>pset.complex_load.TARGET_TABLE != ""</Expression>
</SourceValue>
```

The user interface defined by the specification can also be used to access data stored in an external data structure such as a data file. For example, data from a data file can be used with user interface elements or used to configure a parameter of a dataflow graph. In the example specification portion below, a user interface defined by the portion of the specification below allows a user to enter the path of a file, the contents of which are then accessible using a variable, "ctrl_file_01". For example, the variable has a property, "contents," that can be used to access the entire contents of the file from within elements of the user interface, for example, a user interface element for displaying text. The data represented by variable "ctrl_file_01" and property "contents" can be assigned to other variables or assigned to parameters of a dataflow graph.

```
<TextInput>
<Label>Edit path to control file 1</Label>
<SourceTargetValue reference="ctrl_file_01"
sourceProperty="path" targetProperty="path"/>
</TextInput>
<TextArea>
<Label>Contents of control file 1</Label>
<SourceValue reference="ctrl_file_01" property="contents"/>
</TextArea>
```

Figure 6:
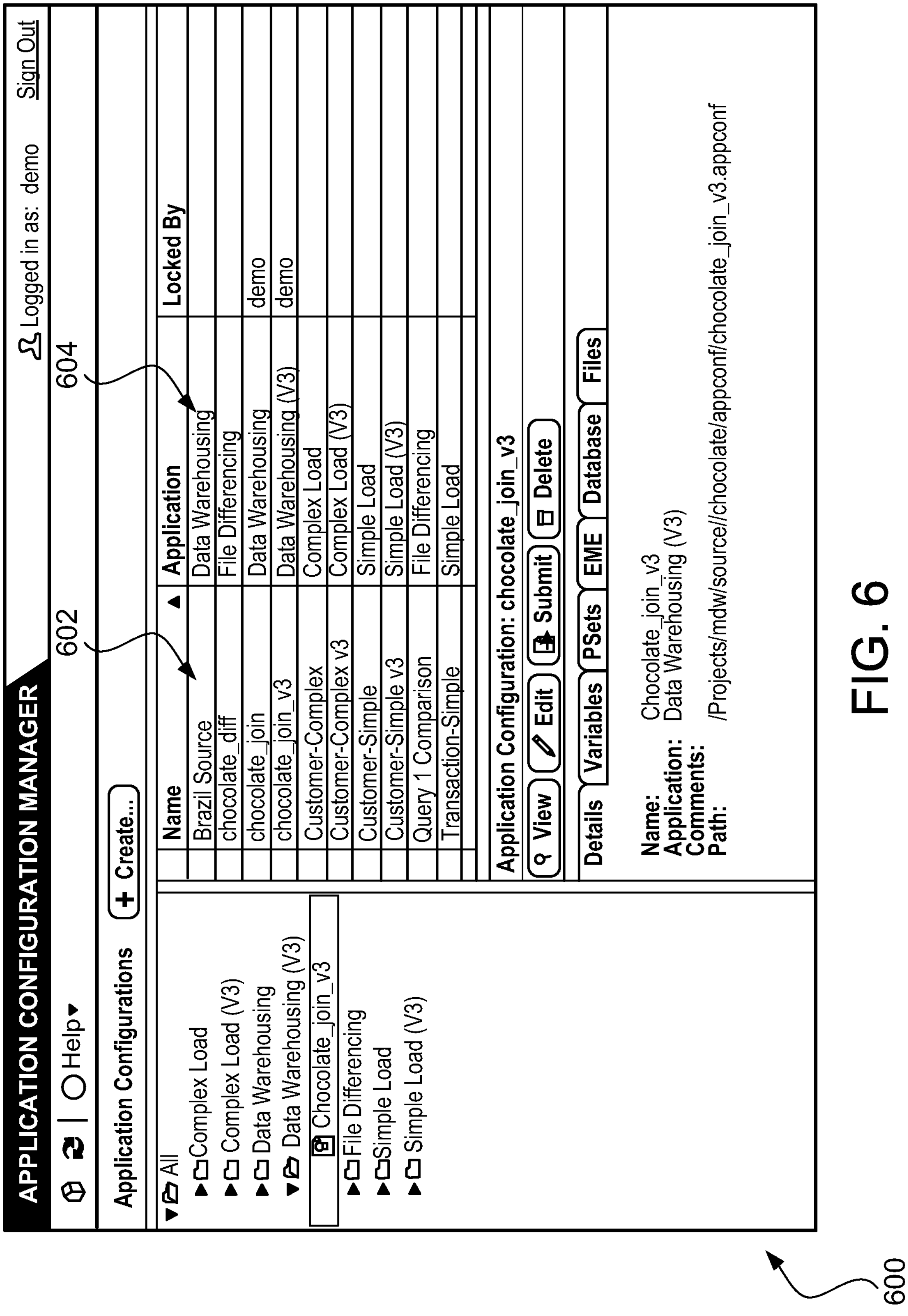
FIG. 6 is a configuration management interface.

FIG. 6 shows a configuration manager interface 600 that can be used to view, create and edit specifications 604. For example, the configuration manager interface 600 can be part of the development environment 28 operated by a user 32 as shown in FIG. 1. The configuration manager interface 600 presents a list of specifications 604, each of which can be used to generate a user interface for configuring an application 602 (e.g., a dataflow graph or collection of dataflow graphs). In some implementations, multiple specifications 604 can be used with the same application 602. For example, one specification may provide a user interface for configuring some parameters associated with the application, while another specification may provide a user interface for configuring other parameters associated with the specification. In some examples, one specification may provide a user interface suitable for a novice or non-technical user, while another specification may provide a user interface suitable for an experienced or technically proficient user.

In some implementations, the system may allow a user to run sample data through the graph by initiating execution of the graph on the server from within the user interface, as configured by the parameter values, and to display the results 720 of the sample run to the user in the user interface, as shown in FIG. 7. The results 720 can be viewed in an appropriate browser or editor of the user interface, depending on what type of data are included in the results 720. In this example, the results 720 include rows that correspond to records within the sample data and columns that correspond to values in the records of for different fields. The execution of the graph on the server using test data can be triggered in response to any of a variety of actions at the client, for example, in response to a user supplying a value for a parameter.

Figure 8:
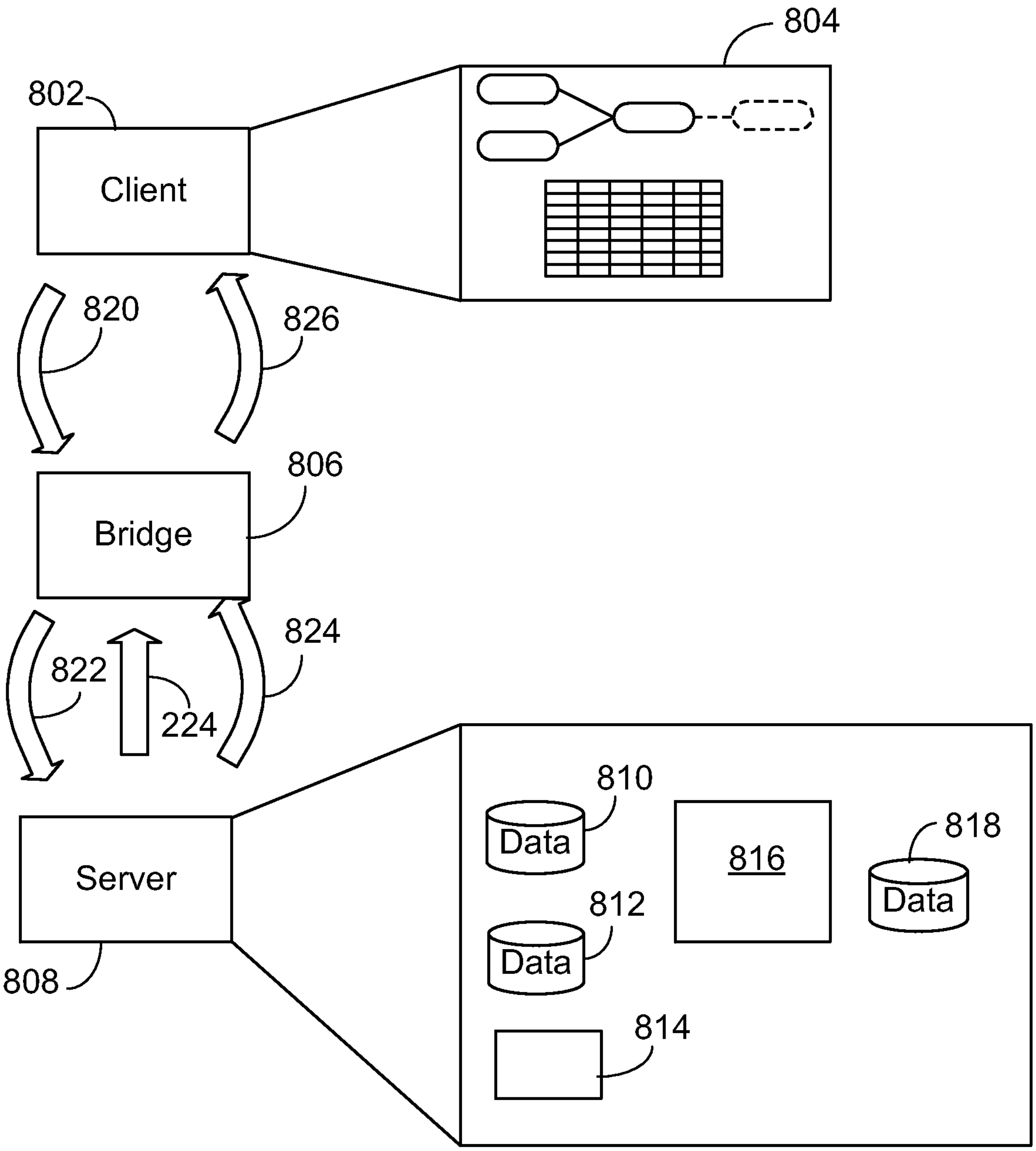
FIG. 8 is a schematic diagram of a bridged client server system.

Referring to FIG. 8, a client system 802 may be displaying the user interface 804 described above the user. The parameter set 814 generated based on interactions with the user through the user interface 804 may be stored on a server 808. Consequently, changes made by the user interface 804 are sent from the client 802 to the server 808 via a bridge 806. Represented by arrow 820, the client 802 sends a message to the bridge 806 in one format, for example a message sent using the simple object access protocol (SOAP). The bridge 806 translates the message into a new format and if necessary begins a client session with the server 808. Represented by arrow 822, the bridge 806 sends a message to the server 808 in a format understood by the server 808, for example a COM+message. The server 808 receives the message and updates the parameter set. Represented by arrow 824, the server 808 sends a reply to the bridge 806 containing any changes that occurred to the parameter set due to the input received by the client 802. The bridge 806 decodes the message and creates a reply message for the client 802. Represented by arrow 826, the bridge 806 sends the reply message to the client 802. The client 802 updates the user interface 804 to reflect the changes, including displaying any components which were previously hidden due to the failure of a precondition as described above.

The user may also indicate to the client 802 that he wishes to execute the graph being constructed using sample data based on the current set of parameters, which may or may not be complete. As above, the client 802 sends a message to the server 808 via the bridge 806. The server 808 applies any changes to the parameter set and a process 816 running on the server compiles the dataflow graph. The compiled dataflow graph accepts data from the sample datasets 810, 812 and executes the compiled dataflow graph. The dataflow graph produces the requested output to an output dataset 818. The output of the dataflow graph is the intermediate data requested by the client 802 and not necessarily the data which would be produced by complete execution of the dataflow graph.

As described above, the resulting data is sent from the server 808 to the client 802 via the bridge 806.

The graph configuration approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method of processing data, the method including presenting, in a first user interface of a first program, a development environment configured to receive information about one or more data processing programs;

receiving input in the first user interface, and, based on the received information and input, generating one or more structured documents;

storing the one or more structured documents in tangible computer-readable data storage media;

the one or more structured documents representing a specification defining a second user interface that enables a user of the second user interface to configure one or more data processing programs;

the one or more structured documents including (1) identification of user interface elements to be presented in the second user interface, (2) variables defining characteristics of the user interface elements, (3) identification of a data processing program capable of being parameterized, wherein the data processing program includes processing steps to be executed by a computer system, (4) identification of one or more parameters to be used in parameterizing the data processing program to generate a parameterized instance of at least part of the data processing program, wherein the parameterized instance may be used to process input data received from at least one data source, and wherein the parameters affect execution of processing of the input data;

executing a second program;

providing the specification to the second program;

instantiating the second user interface by the second program, including, based on the specification, displaying at least one user interface element that enables a user to affect a value of at least one parameter, and displaying an interactive visualization of one or more parameters or variables related to the data processing program;

based on the value of that one parameter, generating a parameterized instance of at least part of the data processing program;

executing the parameterized instance on input data to produce processed data, wherein the processed data may be intermediate data or output data; and displaying display data, based on at least some of the processed data, in the second user interface.

2. The method of claim 1 in which at least some of the characteristics of the user interface elements are based on dependencies between data elements received from at least one of a database, a data file, a metadata repository, and a web service.

3. The method of claim 1 in which the specification defines source values indicating data received during the operation of the second user interface and defines target values indicating data updated during the operation of the second user interface.

4. The method of claim 1, including receiving data associated with the parameters from an external source.

5. The method of claim 4 in which the external source is at least one of the group consisting of: a data file, a database, a metadata engine, and a web service.

6. The method of claim 1 in which at least one parameter defines a property of at least one of the components of the data processing program, the property associated with one of the user interface elements.

7. The method of claim 6 in which the one of the user interface elements is defined to provide data to the property.

8. The method of claim 6 in which the one of the user interface elements is defined to receive data from the property.

9. The method of claim 1 in which, during the operation of the first user interface, at least one of the user interface elements is displayed based on at least one of the variables.

10. The method of claim 9 in which the at least one of the user interface elements is displayed in response to a change in one of the variables.

11. The method of claim 1 in which the specification is defined in an extensible markup language.

12. The method of claim 1 in which the specification includes an expression defined in a language native to a database management system.

13. The method of claim 1, including automatically acquiring at least one parameter from the data processing program.

14. The method of claim 1 in which at least one variable defines a reference to an object stored in a database system.

15. The method of claim 1 in which the specification defines a reference to a data file external to the specification.

16. The method of claim 15 in which the reference includes a pointer to a value stored in the data file.

17. The method of claim 15 in which at least one variable defines the reference.

18. The method of claim 15 in which at least one parameter defines the reference.

19. The method of claim 1 in which the specification includes a query string for accessing data stored in a database system.

20. The method of claim 19 in which the query string includes an argument specified by a user during the operation of the second user interface.

21. The method of claim 19 in which the query string is executable during the operation of the second user interface.

22. The method of claim 19 in which at least one parameter includes the query string.

23. The method of claim 19 in which at least one variable includes the query string.

24. The method of claim 1 in which the data processing program includes a dataflow graph that includes multiple nodes representing components of the dataflow graph and links between the nodes representing flows of data between the components.

25. The method of claim 1, including enabling the user to initiate execution of the parameterized instance of the at least part of the data processing program from within the second user interface.

26. The method of claim 25 in which the execution of the parameterized instance of the at least part of the data processing program occurs in response to a user supplying a value for a parameter.

27. The method of claim 1 in which the data processing program is a component of another data processing program.

28. The method of claim 1 in which the one or more structured documents representing the specification define how interaction between a user and the second user interface is to occur.

29. A system for presenting a development environment, the system configured for:

presenting, in a first user interface of a first program, a development environment configured to receive information about one or more data processing programs;

receiving input in the first user interface, and, based on the received information and input, generating one or more structured documents;

storing the one or more structured documents in tangible computer-readable data storage media;

the one or more structured documents representing a specification defining a second user interface that enables a user of the second user interface to configure one or more data processing programs;

the one or more structured documents including (1) identification of user interface elements to be presented in the second user interface, (2) variables defining characteristics of the user interface elements, (3) identification of a data processing program capable of being parameterized, wherein the data processing program includes processing steps to be executed by a computer system, (4) identification of one or more parameters to be used in parameterizing the data processing program to generate a parameterized instance of at least part of the data processing program, wherein the parameterized instance may be used to process input data received from at least one data source, and wherein the parameters affect execution of processing of the input data;

executing a second program;

providing the specification to the second program;

instantiating the second user interface by the second program, including, based on the specification, displaying at least one user interface element that enables a user to affect a value of at least one parameter, and displaying an interactive visualization of one or more parameters or variables related to the data processing program;

based on the value of that one parameter, generating a parameterized instance of at least part of the data processing program;

executing the parameterized instance on input data to produce processed data, wherein the processed data may be intermediate data or output data; and displaying display data, based on at least some of the processed data, in the second user interface.

30. The system of claim 29 in which at least some of the characteristics of the user interface elements are based on dependencies between data elements received from at least one of a database, a data file, a metadata repository, and a web service.

31. The system of claim 29 in which the specification defines source values indicating data received during the operation of the second user interface and defines target values indicating data updated during the operation of the second user interface.

32. The system of claim 29 in which at least one parameter defines a property of at least one of the components of the data processing program, the property associated with one of the user interface elements.

33. The system of claim 29, the operations including automatically acquiring at least one parameter from the data processing program.

34. The system of claim 29 in which at least one variable defines a reference to an object stored in a database system.

35. The system of claim 29 in which the specification defines a reference to a data file external to the specification.

36. The system of claim 29 in which the specification includes a query string for accessing data stored in a database system.

37. The system of claim 29 in which the data processing program includes a dataflow graph that includes multiple nodes representing components of the dataflow graph and links between the nodes representing flows of data between the components.

38. The system of claim 29, the operations including enabling the user to initiate execution of the parameterized instance of the at least part of the data processing program from within the second user interface.

39. The system of claim 38 in which the execution of the parameterized instance of the at least part of the data processing program occurs in response to a user supplying a value for a parameter.

40. The system of claim 29 in which the one or more structured documents representing the specification define how interaction between a user and the second user interface is to occur.

41. A non-transitory computer-readable storage device storing a computer program for processing data, the computer program including instructions for causing a computer to perform operations including:

presenting, in a first user interface of a first program, a development environment configured to receive information about one or more data processing programs;

receiving input in the first user interface, and, based on the received information and input, generating one or more structured documents;

storing the one or more structured documents in tangible computer-readable data storage media;

the one or more structured documents representing a specification defining a second user interface that enables a user of the second user interface to configure one or more data processing programs;

the one or more structured documents including (1) identification of user interface elements to be presented in the second user interface, (2) variables defining characteristics of the user interface elements, (3) identification of a data processing program capable of being parameterized, wherein the data processing program includes processing steps to be executed by a computer system, (4) identification of one or more parameters to be used in parameterizing the data processing program to generate a parameterized instance of at least part of the data processing program, wherein the parameterized instance may be used to process input data received from at least one data source, and wherein the parameters affect execution of processing of the input data;

executing a second program;

providing the specification to the second program;

instantiating the second user interface by the second program, including, based on the specification, displaying at least one user interface element that enables a user to affect a value of at least one parameter, and displaying an interactive visualization of one or more parameters or variables related to the data processing program;

based on the value of that one parameter, generating a parameterized instance of at least part of the data processing program;

executing the parameterized instance on input data to produce processed data, wherein the processed data may be intermediate data or output data; and displaying display data, based on at least some of the processed data, in the second user interface.

42. The non-transitory computer-readable storage device of claim 41 in which at least some of the characteristics of the user interface elements are based on dependencies between data elements received from at least one of a database, a data file, a metadata repository, and a web service.

43. The non-transitory computer-readable storage device of claim 41 in which the specification defines source values indicating data received during the operation of the second user interface and defines target values indicating data updated during the operation of the second user interface.

44. The non-transitory computer-readable storage device of claim 41 in which at least one parameter defines a property of at least one of the components of the data processing program, the property associated with one of the user interface elements.

45. The non-transitory computer-readable storage device of claim 41, the operations including automatically acquiring at least one parameter from the data processing program.

46. The non-transitory computer-readable storage device of claim 41 in which at least one variable defines a reference to an object stored in a database system.

47. The non-transitory computer-readable storage device of claim 41 in which the specification defines a reference to a data file external to the specification.

48. The non-transitory computer-readable storage device of claim 41 in which the specification includes a query string for accessing data stored in a database system.

49. The non-transitory computer-readable storage device of claim 41 in which the data processing program includes a dataflow graph that includes multiple nodes representing components of the dataflow graph and links between the nodes representing flows of data between the components.

50. The non-transitory computer-readable storage device of claim 41, the operations including enabling the user to initiate execution of the parameterized instance of the at least part of the data processing program from within the second user interface.

51. The non-transitory computer-readable storage device of claim 50 in which the execution of the parameterized instance of the at least part of the data processing program occurs in response to a user supplying a value for a parameter.

52. The non-transitory computer-readable storage device of claim 41 in which the one or more structured documents representing the specification define how interaction between a user and the second user interface is to occur.

* * * * *